US011978861B2

United States Patent
Kim et al.

(10) Patent No.: US 11,978,861 B2
(45) Date of Patent: May 7, 2024

(54) APPARATUS AND METHOD FOR MANUFACTURING SECONDARY BATTERY

(71) Applicant: LG CHEM, LTD., Seoul (KR)

(72) Inventors: Won Nyeon Kim, Daejeon (KR); Jung Kwan Pyo, Daejeon (KR); Cha Hun Ku, Daejeon (KR); Byeong Kyu Lee, Daejeon (KR); Tai Jin Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 766 days.

(21) Appl. No.: 16/619,751

(22) PCT Filed: Feb. 18, 2019

(86) PCT No.: PCT/KR2019/001926
§ 371 (c)(1),
(2) Date: Dec. 5, 2019

(87) PCT Pub. No.: WO2019/190054
PCT Pub. Date: Oct. 3, 2019

(65) Prior Publication Data
US 2020/0212494 A1 Jul. 2, 2020

(30) Foreign Application Priority Data
Mar. 27, 2018 (KR) .................. 10-2018-0035137

(51) Int. Cl.
*H01M 10/04* (2006.01)
*G01B 11/26* (2006.01)
*H01M 10/0585* (2010.01)

(52) U.S. Cl.
CPC ......... *H01M 10/0585* (2013.01); *G01B 11/26* (2013.01); *H01M 10/04* (2013.01); *H01M 10/0404* (2013.01)

(58) Field of Classification Search
CPC ............ H01M 10/0585; H01M 10/04; H01M 10/0404; G01B 11/26
See application file for complete search history.

(56) References Cited

U.S. PATENT DOCUMENTS

2010/0281685 A1* 11/2010 Hori .................. H01M 10/4285
29/761
2011/0273557 A1 11/2011 Ichizawa et al.
(Continued)

FOREIGN PATENT DOCUMENTS

CN 102986080 A * 3/2013 ......... B65H 23/1955
CN 103222097 A 7/2013
(Continued)

OTHER PUBLICATIONS

International Search Report issued in PCT/KR2019/001926 (PCT/ISA/210), dated May 23, 2019.

*Primary Examiner* — Matthew T Martin
*Assistant Examiner* — Krishna R Hammond
(74) *Attorney, Agent, or Firm* — Birch, Stewart, Kolasch & Birch, LLP

(57) ABSTRACT

An apparatus for manufacturing the secondary battery includes a first measurement part photographing unit cells, which are continuously transferred, to measure a position of a first electrode having a relatively large size of the first electrode and a second electrode, which are provided in the unit cells and have polarities opposite to each other, from an image of each of the photographed unit cells; and a first arrangement part disposing the unit cell passing through the first measurement part at a preset position of the separation sheet to adjust an interval between the unit cells disposed on the separation sheet on the basis of the position of the first electrode, which is measured by the first measurement part.

4 Claims, 9 Drawing Sheets

(56) References Cited

U.S. PATENT DOCUMENTS

| | | |
|---|---|---|
| 2013/0240323 A1 | 9/2013 | Min et al. |
| 2014/0027643 A1* | 1/2014 | Aramaki ................. G01B 11/14 |
| | | 250/341.8 |
| 2017/0033384 A1 | 2/2017 | Cho |
| 2019/0173115 A1 | 6/2019 | Cho |
| 2019/0252729 A1* | 8/2019 | Fujiwake ............. H01M 10/04 |
| 2020/0067051 A1* | 2/2020 | Yamashita ........ H01M 10/0463 |

FOREIGN PATENT DOCUMENTS

| | | | |
|---|---|---|---|
| CN | 105987919 A | 10/2016 | |
| JP | 2000-90958 A | 3/2000 | |
| JP | 2010-176897 A | 8/2010 | |
| JP | 5814588 B2 | 11/2015 | |
| KR | 10-0696892 B1 | 3/2007 | |
| KR | 10-0958649 B1 | 5/2010 | |
| KR | 10-2013-0025760 A | 3/2013 | |
| KR | 2013025760 A * | 3/2013 | |
| KR | 10-1334618 B1 | 11/2013 | |
| KR | 10-2014-0117789 A | 10/2014 | |
| KR | 10-2016-0051347 A | 5/2016 | |
| KR | 10-1684550 B1 | 12/2016 | |
| KR | 10-1764718 B1 | 8/2017 | |
| KR | 10-1774261 B1 | 9/2017 | |
| WO | WO-2014079725 A1 * | 5/2014 | ........ H01M 10/0404 |

* cited by examiner

APPARATUS AND METHOD FOR MANUFACTURING SECONDARY BATTERY

CROSS-REFERENCE TO RELATED APPLICATION

The present application claims the benefit of the priority of Korean Patent Application No. 10-2018-0035137, filed on Mar. 27, 2018, which is hereby incorporated by reference in its entirety.

TECHNICAL FIELD

The present invention relates to an apparatus and method for manufacturing a secondary battery, and more particularly, to an apparatus and method for manufacturing a secondary battery, which are capable of improving quality when a plurality of unit cells are stacked.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, the electrode assembly is classified into a jelly-roll type electrode assembly and a stack and folding type electrode assembly.

The stack and folding type electrode assembly has a structure in which unit cells are wound by using a separation film. A method for manufacturing the stack and folding type electrode assembly having the above-described structure comprises an arrangement step of disposing unit cells on a separation film at set intervals, an inspection step of measuring the intervals between the unit cells disposed on the separation film to inspect whether each of the unit cells is defective, and a stacking step of stacking the unit cells with the separation film therebetween to complete a secondary battery.

Here, in the stack and folding type electrode assembly, the intervals between the unit cells disposed on the separation film are adjusted based on the outermost electrode or a separator, which is disposed at the outermost side of the unit cells.

However, in the stack and folding type electrode assembly, it is impossible to accurately adjust the intervals between the unit cells because the intervals between the unit cells disposed on the separation film vary due to a difference in size between an electrode disposed at the outermost side of the unit cells and an electrode disposed inside the unit cells when the intervals between the unit cells disposed on the separation film on the basis of the electrode disposed on the outermost side of the unit cells. Also, when the intervals between the unit cells are adjusted based on the separator provided in the unit cells, it is impossible to accurately adjust the intervals between the unit cells due to contraction of the separator.

DISCLOSURE OF THE INVENTION

Technical Problem

The present invention has been made to solve the above problems, and an object of the present invention is to provide an apparatus and method for manufacturing a secondary battery, in which intervals between unit cells are adjusted based on a first electrode having a relatively large size of the first electrode and a second electrode, which are provided in the unit cells and have polarities opposite to each other. Due to this feature, the intervals between the unit cells may be accurately adjusted to improve stacking quality of the unit cells, thereby preventing a defective electrode assembly from being manufactured.

Technical Solution

To achieve the above object, an apparatus for manufacturing a secondary battery according to the present invention comprises: a separation sheet continuously transferring unit cells, each unit cell having a first electrode and a second electrode, the first electrode being larger than the second electrode and an opposite polarity of the second electrode, a first measurer photographing the unit cells to measure a position of the first electrode and the second electrode from an image of each of the photographed unit cells; and a first arranger disposing the unit cell passing through the first measurer at a preset position of the separation sheet to adjust an interval between the unit cells disposed on the separation sheet on the basis of the position of the first electrode as measured by the first measurer.

The unit cells may comprise a first unit cell and a second unit cell, wherein the first unit cell may have a structure in which the second electrode, a second separator, the first electrode, a first separator, and the second electrode are sequentially stacked, the second unit cell may have a structure in which the first electrode, the first separator, the second electrode, the second separator, and the first electrode are sequentially stacked.

Each first electrode may be a negative electrode, and each second electrode may be a positive electrode.

The first measurer may comprise a first camera that photographs the first unit cell, wherein the first camera may projectively photograph the first electrode provided in the first unit cell so that the first electrode is displayed to the outside through the separator and measure a position of the first electrode through a first electrode image displayed to the outside through the separator.

The first measurer may further comprise a second camera that photographs the second unit, wherein the second camera may photograph each of the first electrodes disposed on an uppermost end and a lowermost end of the second unit cell and analyze an image of the photographed first electrode disposed at the uppermost end and an image of the photographed first electrode disposed at the lowermost end to measure the position of the first electrode by using a mean value of the two positions.

The apparatus may further comprise a second measurer that photographs the unit cells disposed on the separation sheet and measures a distance between each of both ends of the separation sheet in a width direction and the first electrode provided in the unit cell through the image of the photographed unit cell to inspect whether the first electrode is disposed at a center of both the ends of the separation sheet.

The apparatus may further comprise a second arranger that moves the unit cell in the width direction to correct the position of the first electrode provided in the unit cell so that the first electrode is disposed at the center of both the ends of the separation sheet.

The apparatus may further comprise a folder that folds the separation sheet to stack the unit cells disposed on the separation sheet.

A method for manufacturing a secondary battery by using the apparatus for manufacturing the secondary battery according to the present invention comprises: transferring unit cells, each unit cell having a first electrode and a second electrode, the first electrode being larger than the second electrode and an opposite polarity of the second electrode; photographing each of the transferred unit cells to measure a position of the first electrode and the second electrode from an image of the photographed unit cell; and disposing the unit cell at a preset position of the separation sheet to adjust an interval between the unit cells disposed on the separation sheet on the basis of the measured position of the first electrode.

The unit cells may comprise a first unit cell and a second unit cell, wherein the first unit cell may have a structure in which the second electrode, a second separator, the first electrode, a first separator, and the second electrode are sequentially stacked, the second unit cell may have a structure in which the first electrode, a first separator, the second electrode, a second separator, and the first electrode are sequentially stacked, and the first electrode may have an area greater than that of the first electrode.

The first unit cell may be photographed, wherein the first electrode provided in the first unit cell may be projectively photographed to be displayed to the outside through the separator, and the position of the first electrode may be measured through the first electrode image displayed to the outside through the separator.

The second unit cell may be photographed, wherein the first electrodes disposed at the uppermost end and the lowermost end of the second unit cell may be respectively photographed, and an image of the photographed first electrode disposed at the lowermost end and an image of the photographed first electrode disposed at the lowermost end are analyzed to measure the position of the first electrode by using a mean value of the two positions.

The method may further comprise, photographing the unit cell disposed on the separation sheet and measuring a distance between each of both ends of the separation sheet in a width direction and the first electrode provided in the unit cell through the image of the photographed unit cell to inspect whether the first electrode is disposed at a center of both the ends of the separation sheet.

The method may further comprise moving the photographed unit cell in the width direction to correct the position of the first electrode provided in the unit cell so that the first electrode is disposed at the center of both the ends of the separation sheet if the first electrode of the photographed unit cell is not disposed at the center of both the ends of the separation sheet.

The method may further comprise folding the separation sheet to stack the unit cells disposed on the separation sheet.

Advantageous Effects

First: the apparatus for manufacturing the secondary battery according to the present invention may comprise the first measurement part measuring the position of the first electrode having the relatively large size of the first electrode and the second electrode, which have the polarities opposite to each other and the first arrangement part adjusting the intervals between the unit cells on the basis of the position of the first electrode, which is measured by the first measurement part. Due to this feature, the intervals between the unit cells may be accurately adjusted to improve the stacking quality of the unit cells, thereby preventing the defective electrode assembly from being manufactured.

Second: in the apparatus for manufacturing the secondary battery according to the present invention, the unit cells may comprise the first unit cell and the second unit cell. The first unit cell may have the structure in which the second electrode, the second separator, the first electrode, the first separator, and the second electrode are sequentially stacked, and the second unit cell may have the structure in which the first electrode, the first separator, the second electrode, the second separator, and the first electrode are sequentially stacked. The first electrode may have the area greater than that of the second electrode. Due to this feature, the positions of the first electrode provided in the first unit cell and the first electrode provided in the second unit cell may be respectively measured to accurately adjust the interval between the first unit cell and the second unit cell, thereby preventing the defective electrode assembly from being manufactured.

Third: in the apparatus for manufacturing the secondary battery according to the present invention, the first electrode may be the negative electrode, and the second electrode may be the positive electrode. Thus, since the negative electrode that is the first electrode is manufactured to have the size greater than that of the positive electrode that is the second electrode, the position of the first electrode may be stably measured without performing the separate change to accurately measure the interval between the first unit cell and the second unit cell.

Fourth: in the apparatus for manufacturing the secondary battery according to the present invention, the first measurement part may comprise the first measurement member that photographs the first unit cell, wherein the first measurement member may projectively photograph the first electrode provided in the first unit cell so that the first electrode is displayed to the outside through the separator and measure the position of the first electrode through the first electrode image displayed to the outside through the separator. Due to this feature, the position of the first electrode provided in the first unit cell may be accurately measured so that the first unit cell is accurately disposed at the preset position.

Fifth: in the apparatus for manufacturing the secondary battery according to the present invention, the first measurement part may comprise the second measurement member that photographs the second unit, wherein the second measurement member may photograph each of the first electrodes disposed on the uppermost end and the lowermost end of the second unit cell and analyze the image of the photographed first electrode disposed at the uppermost end and the image of the photographed first electrode disposed at the lowermost end to measure the position of the first electrode by using the mean value of the two positions. Due to this feature, the electrodes disposed at the uppermost end and the lowermost end of the second unit cell may be accurately measured. Particularly, the position of the first electrode may be measured by using the mean value of the first electrodes disposed at the uppermost end and the lowermost end to accurately dispose the second unit cell at the preset position.

Sixth: the apparatus for manufacturing the secondary battery according to the present invention may comprise the second measurement part that photographs the unit cell disposed on the separation sheet and measures the distance between each of both the ends of the separation sheet in the width direction and the first electrode provided in the unit cell through the image of the photographed unit cell to inspect whether the first electrode is disposed at the center of both the ends of the separation sheet. Due to this feature, whether the unit cell disposed on the separation sheet is accurately disposed may be inspected to prevent the defective electrode assembly from being manufactured.

Seventh: the apparatus for manufacturing the secondary battery according to the present invention may comprise the second arrangement part that moves the unit cell in the direction of both the ends of the separation sheet to correct the position of the first electrode provided in the unit cell so that the first electrode is disposed at the center of both the ends of the separation sheet. Due to this feature, the position of the unit cell, which is mis-disposed on the separation sheet, may be easily corrected to accurately dispose the unit cell on the separation sheet, thereby preventing the defective electrode assembly from being manufactured.

MODE FOR CARRYING OUT THE INVENTION

Figure 1:
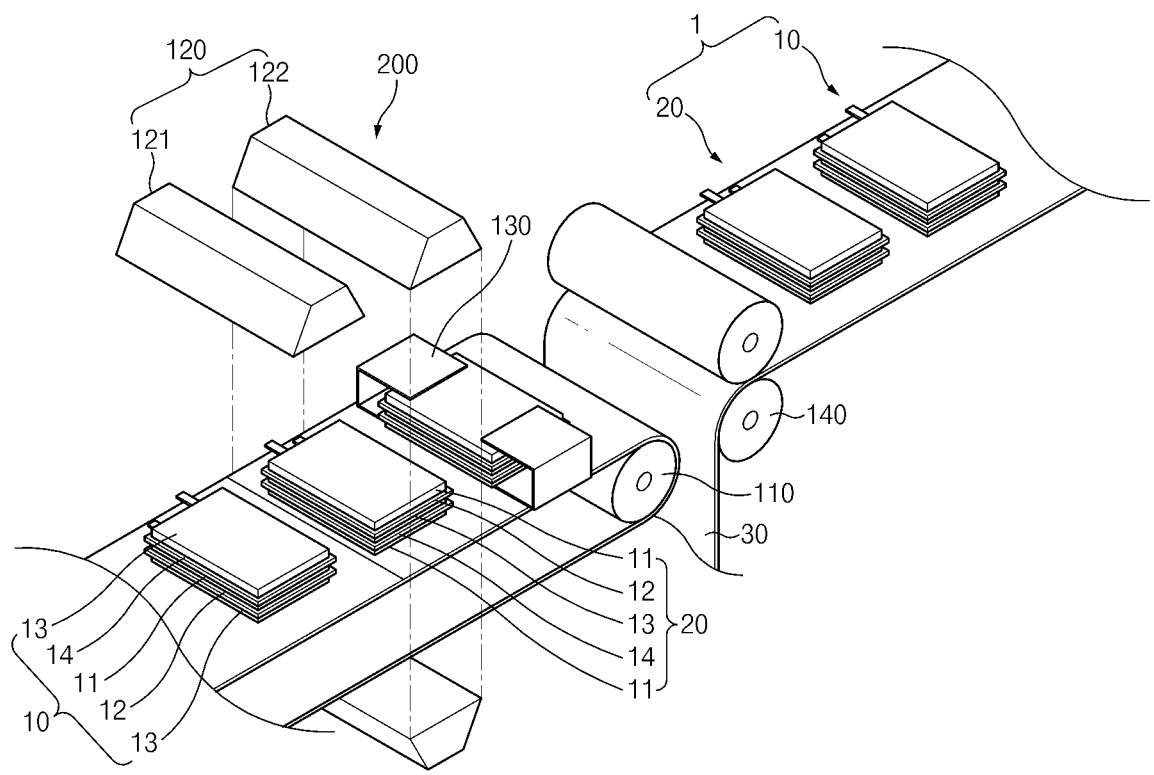
FIG. 1 is a perspective view of a first measurement part and a first arrangement part, which are provided in an apparatus for manufacturing a secondary battery according to an embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Method for Manufacturing Secondary Battery According to Embodiment of the Present Invention]

Figure 2:
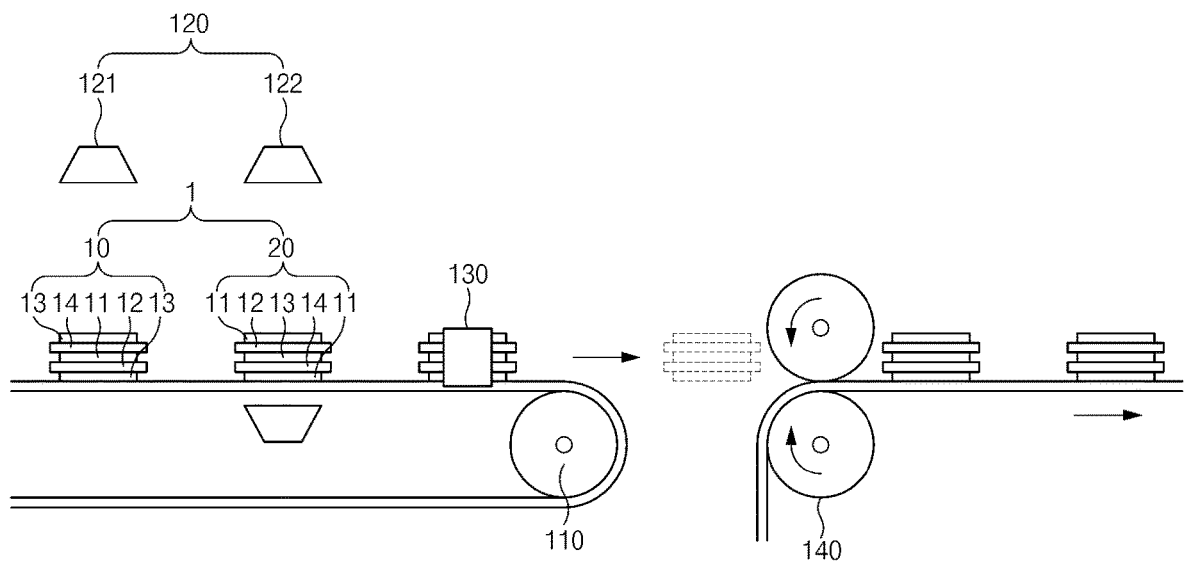
FIG. 2 is a side view of FIG. 1.
Figure 5:
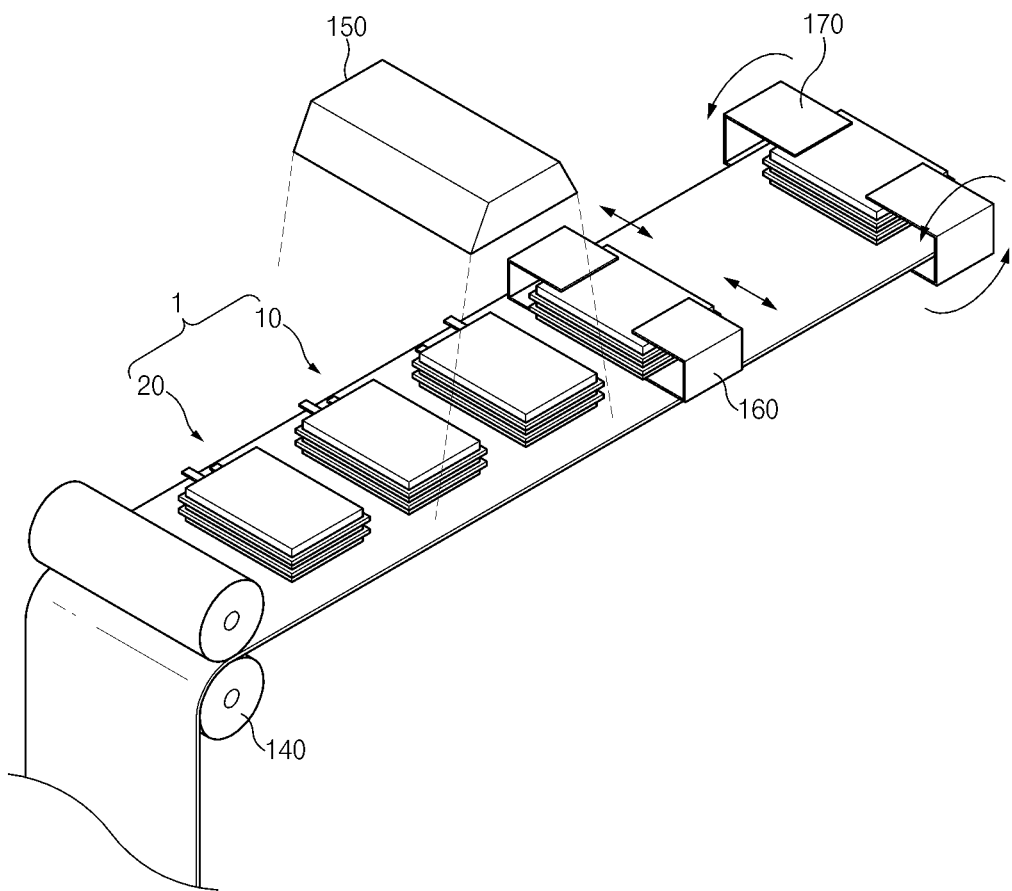
FIG. 5 is a perspective view of a second measurement part and a second arrangement part, which are provided in the apparatus for manufacturing the secondary battery according to an embodiment of the present invention.

As illustrated in FIGS. 1, 2, and 5, an apparatus 100 for manufacturing a secondary battery according to an embodiment of the present invention comprises a transfer part 110 continuously transferring unit cells 1, a first measurement part 120 measuring a position of each of the unit cells 1, which are continuously transferred by the transfer part 110, a first arrangement part 130 disposing each of the unit cells 1 at a preset position of the separation sheet 30 and adjusting an interval between the unit cells 1 disposed on the separation sheet 30 on the basis of the value measured by the first measurement part 120, a combination part 140 transferring the unit cells 1, between which the interval is adjusted, and the separation sheet 30 in a state in which the unit cells 1 and the separation sheet 30 are combined with each other, a second measurement part 150 measuring a distance between each of both ends of the separation sheet 30 in a width direction and the unit cell 1, which are transferred by the combination part 140, a second arrangement part 160 correcting the position of the unit cell 1 so that the unit cell 1 is disposed at a center of the separation sheet 30 in the width direction on the basis of the value measured by the second measurement part 150, and a folding part 170 folding the separation sheet 30 to stack the unit cells 1.

Transfer Part

The transfer part 110 transfers the unit cell. Here, the transfer part 110 may be provided as a conveyor belt to transfer the unit cell 1 up to the combination part.

Unit Cell

Referring to FIG. 1, the unit cell 1 comprises a first unit cell 10 and a second unit cell 20. Each of the first unit cell 10 and the second unit cell 20 has a structure in which electrodes having the same polarity are disposed at the outermost sides. The outermost electrode of the first unit cell 10 and the outermost electrode of the second unit cell 20 may have polarities different from each other.

For example, the first unit cell 10 has a structure in which a second electrode 13, a second separator 14, a first electrode 11, a first separator 12, and a second electrode 13 are sequentially stacked, and the second unit cell 20 has a structure in which the first electrode 11, the first separator 12, the second electrode 13, the second separator 14, and the first electrode 11 are sequentially stacked.

Here, the first electrode 11 may be a negative electrode, and the second electrode 13 may be a positive electrode. Also, the first electrode 11 that is the negative electrode may have a size greater than that of the second electrode that is the positive electrode.

First Measurement Part

The first measurement part 120 photographs the unit cell 1 that are continuously transferred by the transfer part and measures a position of the first electrode 11 having a relatively large size of the first electrode 11 and the second electrode 13, which are provided in the unit cell 1 and have polarities opposite to each other, from an image of each of the photographed unit cells 1.

Here, the first measurement part 120 comprises a first measurement member 121 measuring a position of the first electrode 11 provided in the first unit cell 10 and second measurement members 122 measuring a position of the first electrode 11 provided in the second unit cell 20.

Figure 3:
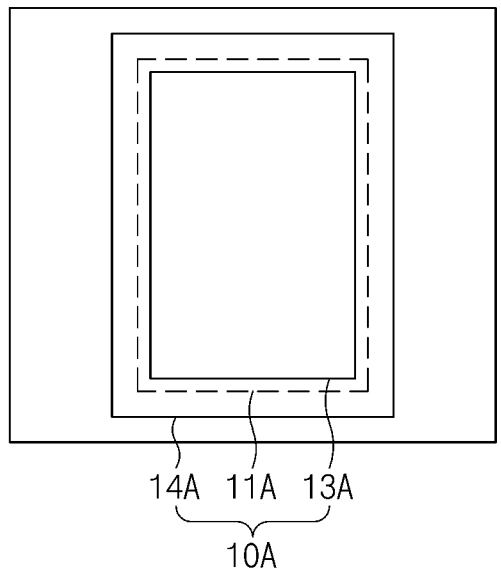
FIG. 3 is a plan view illustrating an image obtained by photographing a first unit cell through the apparatus for manufacturing the secondary battery according to an embodiment of the present invention.

As illustrated in FIG. 3, the first measurement member 121 photographs the first unit cell 10 transferred by the transfer part 110. Here, the first measurement member 121 projectively photographs the first electrode 11 provided in the first unit cell 10 so that the first electrode 11 is displayed to the outside through the second separator 14 and measures a position of the first electrode 11 through a second separator image 14A from the projectively photographed first unit cell image 10A and a first electrode image 11A displayed to the outside through a second electrode image 13A.

That is, as illustrated in FIG. 3, the first measurement member 121 is configured to measure the position of the first electrode disposed in the first unit cell 10. The first measurement member 121 is disposed above the transfer part 110 to projectively photograph the first unit cell 10 transferred by the transfer part 110. Thus, the second electrode image 13A, the second separator image 14A, and the first electrode image 11A may be obtained from the photographed unit cell image 10A. Here, since the first electrode has a size greater than that of the second electrode, the position of the first electrode 11 may be accurately measured.

Figure 4A:
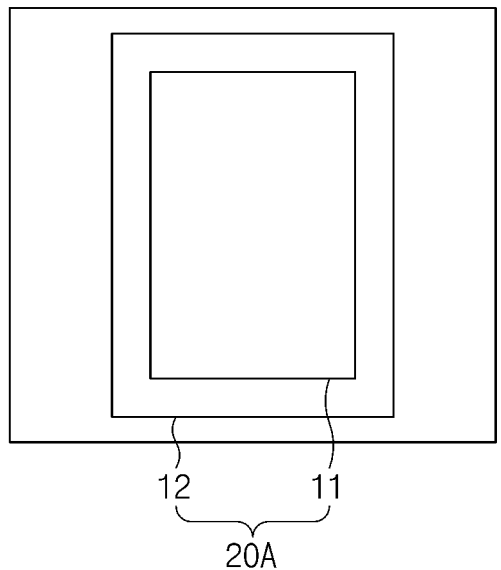
FIGS. 4A and 4B are plan views illustrating an image obtained by photographing each of the uppermost end and the lowermost end of a second unit cell through the apparatus for manufacturing the secondary battery according to an embodiment of the present invention.
Figure 4B:
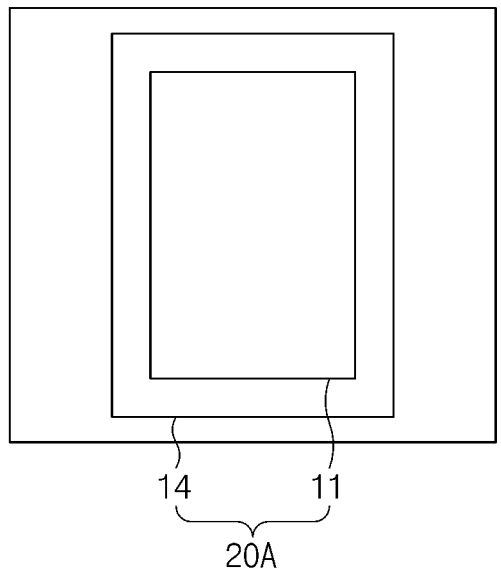

As illustrated in FIGS. 4A and 4B, the second measurement members 122 are configured to measure the position of the first electrode provided at the outermost side of the second unit cell. Here, the second measurement member 122 may be respectively disposed above and below the transfer part 110 to photograph the second unit cell 20 transferred by the transfer part 110. Thus, an image 20A of the second unit cell in which the first electrode 11 is disposed at the uppermost end as illustrated in FIG. 4A and an image 20A of the second unit cell in which the first electrode 11 is disposed at the lowermost end as illustrated in FIG. 4B may be obtained. Also, the position of the uppermost first electrode may be measured from the image 11A of the photographed first electrode disposed at the uppermost end, and the position of the lowermost first electrode 11 may be measured from the image 11A of the first electrode disposed at the lowermost end. Then, a position value of the first electrode provided in the second unit cell 20 may be obtained through a mean value of the measured positions of the uppermost and lowermost first electrodes 11.

First Arrangement Part

The first arrangement part 130 allows the unit cell 1 passing through the first measurement part 120 to be disposed at a preset position of the separation sheet 30. Here, an interval between the unit cells 1 disposed on the separation sheet 30 may be adjusted based on the position of the first electrode 11, which is measured by the first measurement part 120.

For example, referring to FIG. 1, the first arrangement part 130 holds the first unit cell 10 transferred by the transfer part and passing through the first measurement part 120 to supply the first unit cell 10 to the combination part 140 into which the separation sheet 30. Here, the first arrangement part 130 calculates a position of the first electrode 11 of the held first unit cell 10 and a position of the first electrode 11 of the second unit cell 20, which is previously supplied to the combination part 140, to supply the first unit cell 10 to the combination part 140, thereby adjusting an interval between the second unit cell 20 and the first unit cell 10.

Thus, the first arrangement part 130 may adjust the interval between the unit cells on the basis of the position of the first electrode having a relatively large size of the first electrode and the second electrode, which are provided in the unit cell, to accurately adjust the interval between the second unit cell 20 and the first unit cell 10, thereby improving stacking alignment of the unit cells and preventing a defective electrode assembly from being manufactured.

Combination Part

The combination part 140 press-fits the unit cell 1 disposed on the separation sheet 30 therebetween to combine the unit cell 1. The combination part 140 comprises a pair of rollers. The pair of rollers press-fits the unit cell 1 and the separation sheet 30, which pass therebetween, to combine the unit cell 1 with the separation sheet 30.

Second Measurement Part

Figure 6:
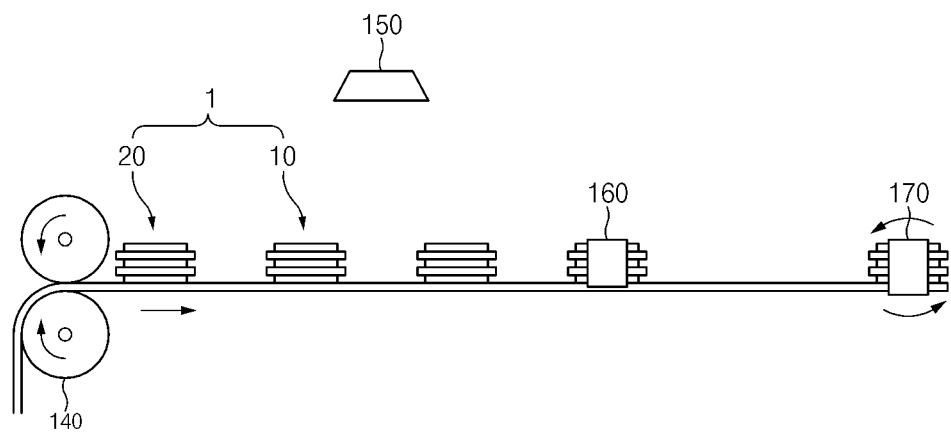
FIG. 6 is a side view of FIG. 5.

As illustrated in FIGS. 5 and 6, the second measurement part 150 is configured to measure a meandering defect of the unit cell disposed on the separation sheet. The second measurement part 150 photographs the unit cell 1 disposed on the separation sheet 30 to measure a distance between both ends of the separation sheet 30 in the width direction and the first electrode 11 provided in the unit cell 1 from an image of the photographed unit cell 1, thereby inspecting whether the first electrode is disposed at a center of both the ends of the separation sheet 30, i.e., inspecting the meandering defect.

Figure 7:
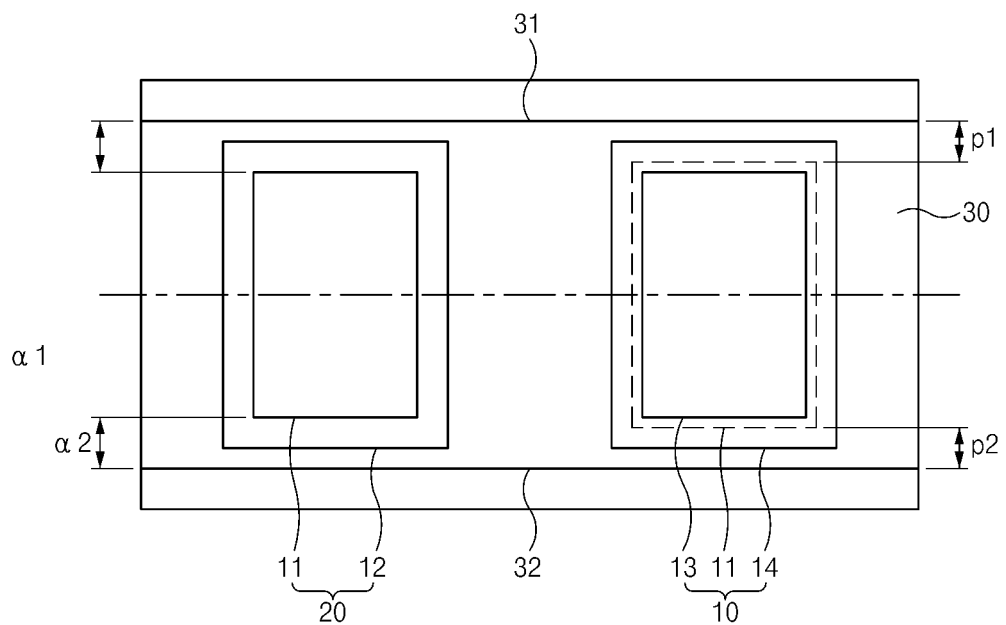
FIG. 7 is a plan view illustrating an image obtained by photographing a unit cell disposed on a separation sheet through the apparatus for manufacturing the secondary battery according to an embodiment of the present invention.

That is, referring to FIG. 7, the second measurement part 150 measures positions of the first unit cell 10 and the second unit cell 20, which are disposed on the separation sheet 30, from the image of the photographed unit cell 1 disposed on the separation sheet 30. Also, each of a first distance value $\alpha 1$ between one end 31 of the separation sheet 30 in the width direction and one end of the first electrode 11 of the first unit cell 10 and a second distance value $\alpha 2$ between the other end 32 of the separation sheet 30 in the width direction and the other end of the first electrode 11 of the first unit cell 10 is measured. Here, when a difference value ($\alpha 1 - \alpha 2$) between the measured first distance value $\alpha 1$ and the measured second distance value $\alpha 2$ is within a preset value, it is determined as normal, and when the difference value is out of the preset value, it is determined as defective. The meandering defect of the first unit cell 10 disposed on the separation sheet 30 may be inspected through the above-described method.

Here, a line 'A' illustrated in FIG. 7 represents an image frame of the photographed unit cell.

The second measurement part 150 measures each of a third distance p1 between one end 31 of the separation sheet 30 in the width direction and the first electrode 11 of the second unit cell 20, preferably, one end of the uppermost first electrode 11 and a fourth distance p2 between the other end 32 of the separation sheet 30 in the width direction and the other end of the first electrode 11 of the second unit cell 20 and the other end of the first electrode 11 of the second unit cell 20. Here, when a difference value (p1−p2) between the measured third distance value p1 and the measured fourth distance value p2 is within the preset value, it is determined as a normal product, and when the difference value is out of the preset value, it is determined as defective. The meandering defect of the second unit cell 10 disposed on the separation sheet 30 may be inspected through the above-described method.

The second measurement part 150 may further measure a position of the first electrode of the first unit cell 10 and a position of the first electrode of the second unit cell 20 from the photographed image. Thus, it may be reconfirmed whether the interval between the first unit cell 10 and the second unit cell 20 is within the preset interval.

Second Engagement Part

Second engagement part 160 is determined that the first unit cell 10 and the second unit cell 20, which are disposed on the separation sheet, are determined as the meandering defect, the second arrangement part 160 moves the unit cell 1 in a direction of both ends of the separation sheet 30, which is the width direction, to correct the position of the first electrode 11 provided in the unit cell 1 so that the first electrode 11 is disposed at a center of both ends of the separation sheet 30.

That is, the second arrangement part 160 holds the first unit cell 10 disposed on the separation sheet to move the first unit cell 10 in the direction of both the ends of the separation sheet 30, which the width direction, according to the difference value ($\alpha 1 - \alpha 2$) between the measured first distance value $\alpha 1$ and the measured second distance $\alpha 2$, thereby correcting the position of the first electrode 11 of the first unit cell 10 so that the first electrode 11 is disposed at the center of both the ends of the separation sheet 30.

The second arrangement part 160 holds the second unit cell 20 disposed on the separation sheet to move the second unit cell 20 in the direction of both the ends of the separation sheet 30, which the width direction, according to the difference value (p1−p2) between the measured third distance value p1 and the measured fourth distance p2, thereby correcting the position of the first electrode 11 of the second unit cell 20 so that the first electrode 11 is disposed at the center of both the ends of the separation sheet 30.

Folding Part

The folding part 170 may fold the separation sheet 30 so that the first unit cell 10 and the second unit cell 20, which are the unit cells disposed on the separation sheet 30, are alternately stacked. Thus, the first unit cell 10 and the second unit cell 20 may be alternately stacked based on the first electrode having a size greater than that of the second electrode to improve accuracy in stacking of the first unit cell 10 and the second unit cell 20.

Thus, the apparatus 100 for manufacturing the secondary battery according to an embodiment of the present invention may measure the position of the first electrode having the relatively large size of the first electrode and the second electrode, which are provided in the unit cell, to adjust the interval between the unit cells disposed on the separation sheet on the basis of the first electrode. Due to this feature, the interval between the unit cells may be accurately adjusted to improve the accuracy in stacking during the stacking of the electrode assembly, thereby preventing the defective electrode from being manufactured.

[Method for Manufacturing Secondary Battery According to Embodiment of the Present Invention]

Hereinafter, a manufacturing method using the apparatus for the secondary battery according to an embodiment of the present invention will be described.

Figure 8:
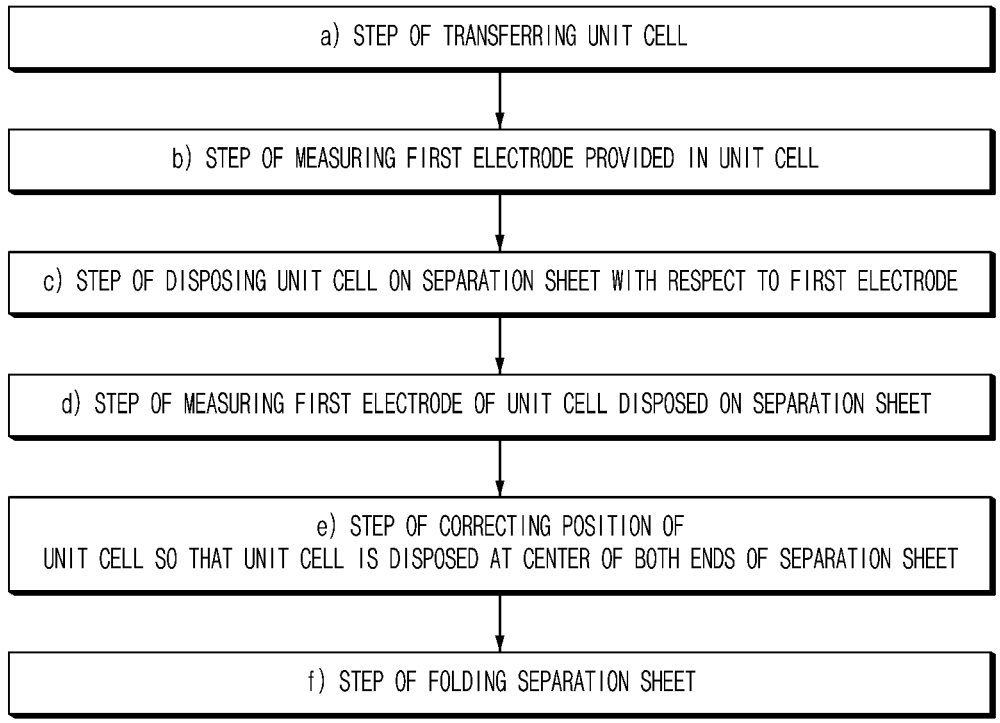
FIG. 8 is a flowchart illustrating a method for manufacturing a secondary battery according to an embodiment of the present invention.

As illustrated in FIG. 8, a method for manufacturing a secondary battery according to an embodiment of the present invention comprises a step (a) of transferring a unit cell, a step (b) of measuring a position of a first electrode having a relatively large size of the first electrode and a second electrode, which are provided in the unit cell, a step (c) of adjusting an interval between unit cells disposed on a separation sheet on the basis of the first electrode, a step (d) of inspecting a meandering defect of the unit cells disposed on the separation sheet, a step (e) of correcting the position of the first electrode provided in the unit cell so that the first electrode is disposed at a center of both ends of the separation sheet in a width direction, and a step (f) of folding the separation sheet to stack the unit cells.

As illustrated in FIGS. 1 and 2, in the step (a), the unit cell 1 is transferred to the combination part 140 by using the transfer part 110.

Here, the unit cell 1 comprises a first unit cell 10 and a second unit cell 20. The first unit cell 10 has a structure in which a second electrode 13, a second separator 14, a first electrode 11, a first separator 12, and a second electrode 13 are sequentially stacked, and the second unit cell 20 has a structure in which the first electrode 11, the first separator 12, the second electrode 13, the second separator, and the first electrode 11 are sequentially stacked. The first electrode is a negative electrode, and the second electrode is a positive electrode. The first electrode that is the negative electrode has a size greater than that of the second electrode that is the positive electrode.

Thus, in the step (a), the first unit cell 10 and the second unit cell 20, which are unit cells, are transferred up to the combination part 140 by using the transfer part 110.

In the step (b), the unit cell 1 transferred by the transfer part 110 is photographed by using the first measurement part 120. Here, a position of the first electrode having a relatively large size of the first electrode and the second electrode, which are provided in the unit cell 1, is measured.

Here, the step (b) comprises a first process of measuring the position of the first electrode 11 provided in the first unit cell 10 and a second process of measuring the position of the first electrode 11 provided in the second unit cell 20.

In the first process, the first unit cell 10 is photographed through the first measurement member 121 of the first measurement part 120. As illustrated in FIG. 3, the first electrode 11 provided in the first unit cell 10 is photographed to be displayed to the outside through a second separator 14, and the position of the first electrode 11 provided in the first unit cell 10 is measured through a first electrode image displayed through the second separator 14.

In the second process, the second unit cell 20 is photographed through the second measurement member 122 of the first measurement part 120. As illustrated in FIGS. 4A and 4B, the first electrodes 11 disposed at the uppermost end and the lowermost end of the second unit cell 20 are respectively photographed, and an image of the photographed first electrode that is disposed at the uppermost end and an image of the photographed first electrode that is disposed at the lowermost end are analyzed to measure a position of the first electrode 11 provided in the second unit cell 20 through a mean value of the two positions.

In the step (c), an interval between the unit cells 1 is adjusted through the first arrangement part 130 so that the unit cells 1 are disposed at a preset interval on a surface of the separation sheet. That is, the first arrangement part 130 adjusts the interval between the first unit cells 1 so that the first unit cells 1 are disposed at the preset interval on the basis of the first electrode provided in the unit cell 1.

That is to say, the first arrangement part 130 holds the first unit cell 10 and the second unit cell 20, which pass through the transfer part 110 and the first measurement part 120, to supply the first unit cell 10 and the second unit cell 20 to the combination part 140. Here, the supply interval may be adjusted so that the first electrode provided in the first unit cell 10 or the first electrode 11 provided in the second unit cell 20 are disposed at the preset interval.

In the step (d), the unit cell 1 disposed on the separation sheet 30 is photographed by using the second measurement part 150 to measure a distance between both ends of the separation sheet 30 in the width direction from the image of the photographed unit cell 1, thereby inspecting whether the first electrode 11 is disposed at the center of both the ends of the separation sheet 30 in the width direction.

In the step (e), when the first electrode 11 of the photographed unit cell 1 is not disposed at the center of both the ends of the separation sheet 30, the unit cell 1 moves in a direction of both the ends with respect to the width direction to correct the position so that the first electrode provided in the unit cell 1 is disposed at the center of both the ends of the separation sheet 30.

In the step (f), the separation sheet 30 is folded to stack the unit cell 1 disposed on the separation sheet 30.

Thus, in the method for manufacturing the secondary battery according to an embodiment of the present invention, a finished product electrode assembly may be obtained, which is stacked based on the first electrode.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for manufacturing a secondary battery, the apparatus comprising:
    a separation sheet continuously transferring unit cells, each unit cell having a first electrode and a second electrode, the first electrode being larger than the second electrode and an opposite polarity of the second electrode;
    a conveyor for moving the unit cells to the separation sheet;
    a first measurer photographing the unit cells on the conveyor to measure a position of the first electrode and the second electrode from an image of each of the photographed unit cells;
    a first arranger disposing the unit cell passing through the first measurer at a preset position of the separation sheet to adjust an interval between the unit cells disposed on the separation sheet while the unit cells are on the conveyor on the basis of the position of the first electrode as measured by the first measurer; and
    a second measurer that photographs the unit cells disposed on the separation sheet and measures a distance between each end of the separation sheet in a width direction and the first electrode provided in the unit cell through the image of the photographed unit cell to inspect whether the first electrode is disposed at a center of ends of the separation sheet,
    wherein the unit cells comprise a first unit cell and a second unit cell,
    wherein the first unit cell has a structure in which the second electrode forming an uppermost layer, a second separator, the first electrode, a first separator, and the second electrode are sequentially stacked, the second separator completely covering the first electrode,
    wherein the second unit cell has a structure in which the first electrode forming an uppermost layer, the first separator, the second electrode, the second separator, and the first electrode forming a lowermost layer are sequentially stacked,
    wherein the first electrode has an area greater than an area of the second electrode,
    wherein the first measurer comprises a first camera that photographs the first unit cell,
    wherein the first camera projectively photographs the first electrode provided in the first unit cell so that the first electrode is displayed to the outside through the second separator and measures a position of the first electrode through a first electrode image displayed to the outside through the second separator,
    wherein the first measurer further comprises a second camera that photographs the second unit cell, and
    wherein the second camera photographs each of the first electrodes disposed on an uppermost end and a lowermost end of the second unit cell and analyzes an image of the photographed first electrode disposed at the uppermost end and an image of the photographed first electrode disposed at the lowermost end to measure the position of the first electrode by using a mean value of the two positions.

2. The apparatus of claim 1, wherein each first electrode is a negative electrode, and each second electrode is a positive electrode.

3. The apparatus of claim 1, further comprising a second arranger that moves the unit cell in the width direction while the unit cells are on the separator sheet to correct the position of the first electrode provided in the unit cell so that the first electrode is disposed at the center of the ends of the separation sheet.

4. The apparatus of claim 1, further comprising a folder that folds the separation sheet to stack the unit cells disposed on the separation sheet.

* * * * *